United States Patent [19]

Patino

[11] Patent Number: 5,684,387

[45] Date of Patent: Nov. 4, 1997

[54] VOLTAGE CUTOFF COMPENSATION METHOD FOR A BATTERY IN A CHARGER

[75] Inventor: Joseph Patino, Pembroke Pines, Fla.

[73] Assignee: Motorola, Inc., Schaumburg, Ill.

[21] Appl. No.: 698,537

[22] Filed: Aug. 15, 1996

[51] Int. Cl.$^6$ .......................... H01M 10/44; H01M 10/46
[52] U.S. Cl. .................. 320/30; 320/43; 320/48; 324/427
[58] Field of Search .................... 320/5, 29, 30, 320/32, 35, 37, 39, 43, 48; 324/427, 430, 431, 433, 434

[56] References Cited

U.S. PATENT DOCUMENTS

| | | | |
|---|---|---|---|
| 5,150,031 | 9/1992 | James et al. | 320/2 |
| 5,166,623 | 11/1992 | Ganio | 324/427 |
| 5,184,059 | 2/1993 | Patino et al. | 320/15 |
| 5,185,566 | 2/1993 | Goedken et al. | 320/48 |
| 5,200,688 | 4/1993 | Patino et al. | 320/13 |
| 5,241,259 | 8/1993 | Patino et al. | 320/35 |
| 5,317,249 | 5/1994 | Ford | 320/2 |
| 5,325,040 | 6/1994 | Bogut et al. | 320/22 |
| 5,371,453 | 12/1994 | Fernandez | 320/5 |

*Primary Examiner*—Edward Tso
*Attorney, Agent, or Firm*—Barbara R. Doutre

[57] ABSTRACT

A battery charging system (300) is capable of maintaining a fully charged battery (304) without overcharging or undercharging the battery regardless of the chemistry type, number of cells, state of charge, or rated charge current. A charging technique (200) allows a charger (306) to sense a capacity indicator of the battery, through a capacity resistor (Rc) or memory (302) located in the battery (304), and translate data pertaining to the number of battery cells, the battery chemistry, and the rated charge current into a relative impedance (210), a cutoff adjustment voltage (212), and a stead state cutoff voltage (214). An adjusted steady state cutoff voltage is determined (216) and used as a threshold with which to compare the battery voltage (220).

13 Claims, 3 Drawing Sheets

5,684,387

1

VOLTAGE CUTOFF COMPENSATION METHOD FOR A BATTERY IN A CHARGER

TECHNICAL FIELD

This invention relates to battery chargers and more particularly to the charging techniques used in such chargers.

BACKGROUND

Referring to FIG. 1, there is shown a prior art block diagram for a battery charging system 100 consisting of a charger 102, radio battery 104 and radio 106. Radio 106 contains positive (B+) and negative (B−) battery terminals which are coupled to radio battery 104 via battery contacts 108 and 110, respectively. Battery 104 contains one or more battery cells 112, which dictate the voltage and current capacity of battery 104. It is very common for batteries which are used in portable radios to have a thermistor (Rt) 114 and a battery capacity resistor (Rc) 116. Also, typically included as part of the battery 104, is protection diode (D1). The thermistor 114 is typically monitored by the charger 102 to determine the temperature of the battery. The capacity resistor (Rc) is typically monitored by the charger 102 to determine the capacity of the battery 104, prior to the battery being charged. The battery charger 102 upon determining the battery capacity (e.g., 1000 milli-amp-hour maH) will select the proper charging rate to use, in order to optimally charge the battery.

Charger 102 and battery 104 in the prior art scheme 100 use four interconnections between the charger 102 and battery 104. These interconnections include a B+ line 118 which provides the current to the battery, a Rc line 120 which is used to sense the capacity resistor (Rc) 116, a thermistor sense line 122 which is used to sense the resistance value of thermistor 114, and a B− (ground) line 124. The charger 102 includes a charger monitor circuit 126 having analog-to-digital converter A/D inputs for monitoring the battery voltage, Rc, and Rt lines. Also included in charger 102 is a charger control circuit 128 to control the charging of battery 104 through the B+ line in response to the status of the battery as indicated through the A/D inputs.

Batteries are typically charged until either a predetermined delta temperature or an absolute temperature is sensed through the Rt line 122 or a predetermined cutoff voltage is sensed through the B+ line 118. Certain charging environments, however, are more difficult to control than others and necessitate sensing only the B+ contact. For example, in a mobile environment where the charger 102 might reside in a vehicular adapter, high temperatures can false a delta temperature measurement, (e.g. taking the radio from an air conditioned room to a hot car). Hence, there are some charging environments where the voltage cutoff approach is more desirable than the temperature cutoff approach.

Chargers typically have only one battery cutoff voltage value for all batteries regardless of the amount of charge current applied, the battery chemistry, the number of cells, or the state of the charge of the battery. A battery cutoff which is too low will cause the battery to prematurely terminate rapid charge, thus adversely affecting the charge capacity. A voltage cutoff that is too high will cause the battery to overcharge, which will adversely affect the battery's cycle life performance. Hence, using a single cutoff voltage has the disadvantage of not accounting for different battery types or different charge states of a battery.

Accordingly, there is a need for a battery charger system capable of completing a charge cycle and maintaining a fully

2 charged battery without overcharging or undercharging the battery. A charger which could dynamically adjust itself to various batteries regardless of their chemistry type, number of cells, state of charge, or rated charge current would be an enhancement to battery charging systems.

DETAILED DESCRIPTION OF THE PREFERRED EMBODIMENTS

Figure 1:
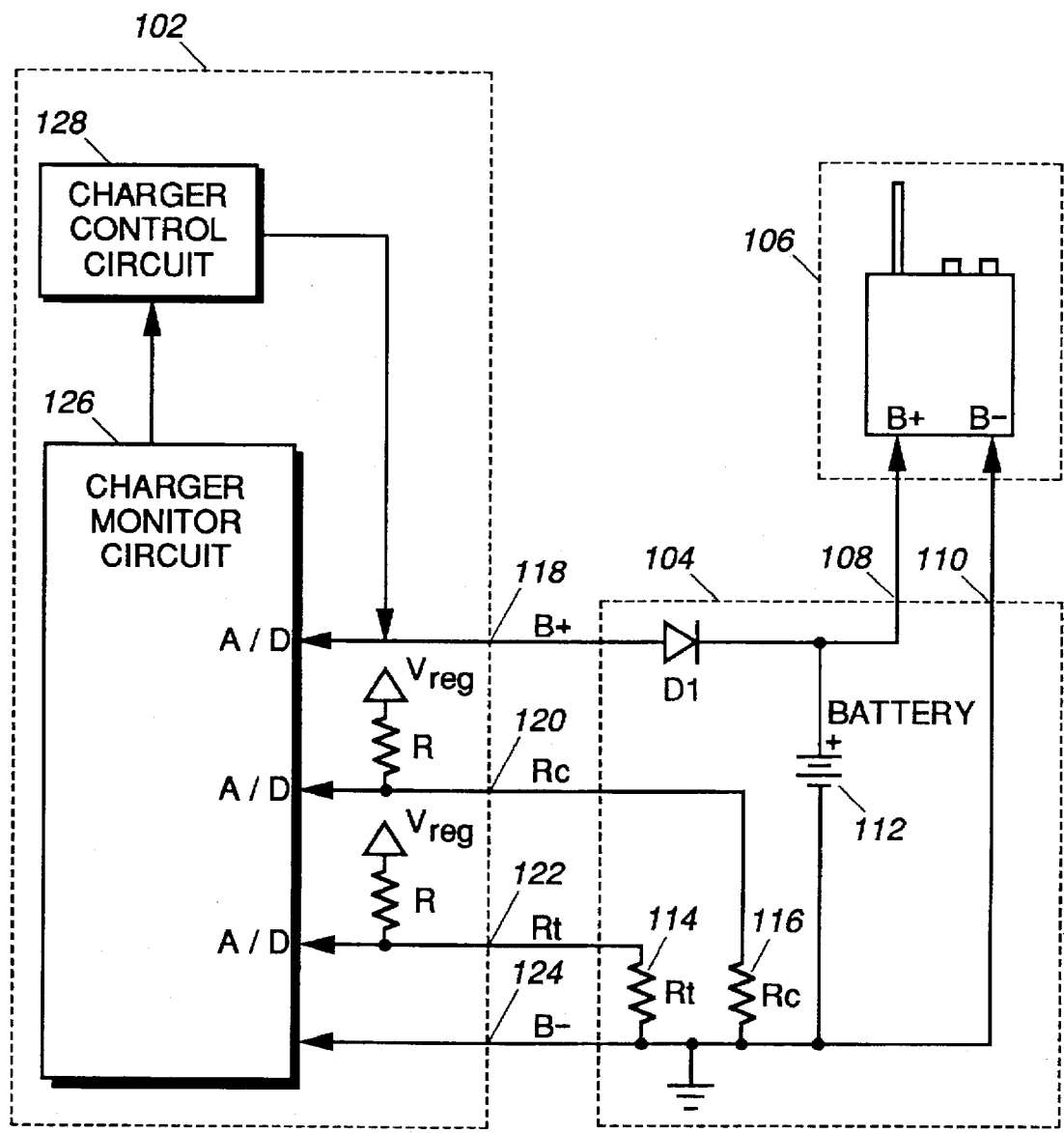
FIG. 1 is a schematic of a prior art battery charging system.

The Rc contact of FIG. 1 provides a voltage indicating the number of battery cells, the battery chemistry and the charge rate of a battery inserted in a charger. The battery chemistry determines the steady state cutoff voltage per battery cell (Vss/cell). Steady state voltage is a voltage measured at the B+ terminal in an unloaded condition. The charging technique to be described herein utilizes these factors along with a measurement of relative impedance to establish an adjustable steady state cutoff voltage which allows batteries of various types and charge statuses to be optimally charged.

Figure 2:
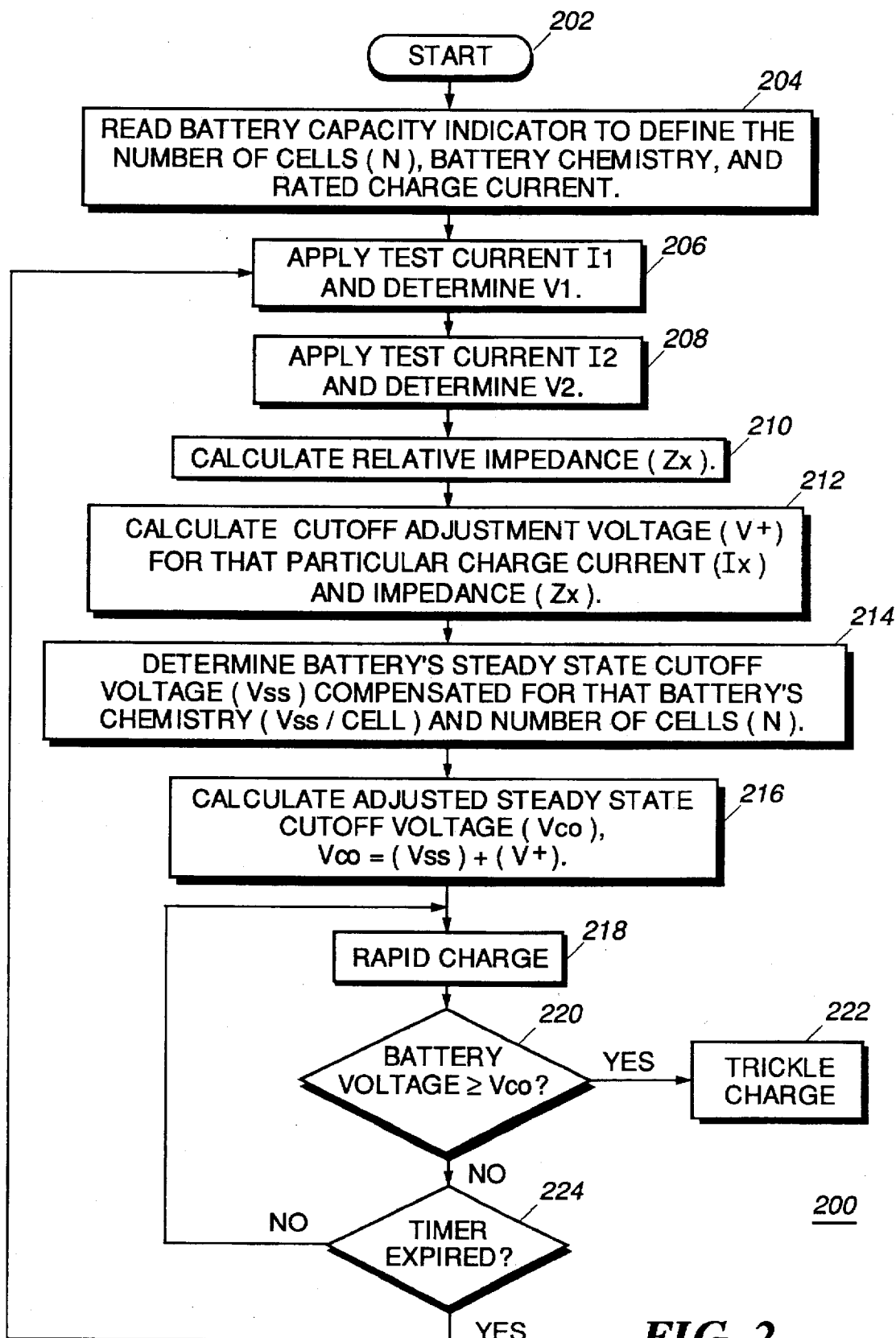
FIG. 2 is a flowchart of a battery charging technique in accordance with the present invention.

Referring now to FIG. 2, there is shown a flowchart describing a charging technique 200 in accordance with the present invention. The technique commences a battery recognition routine at step 202, this step can include short circuit tests and general battery integrity tests if desired. The charger then proceeds to step 204, to read a battery capacity indicator, such as a capacity resistor, to determine the number of battery cells (N), the battery chemistry, and the rated charge current (Ix) of the presently inserted battery. Steps 206, 208, and 210 measure the relative impedance of the battery by submitting the battery charging terminal B+ to a first load current (I1) and measuring a first voltage (V1) at step 206, and then applying a second load current (I2) and measuring a second voltage (V2) at step 208. The relative impedance is calculated at step 210 by dividing the delta voltage by the delta current, $Zx=(V_2-V_1)/(I_2-I_1)$.

The charging technique of the present invention continues to step 212 where a cutoff adjustment voltage ($V^+$) is calculated by multiplying the relative impedance (Zx) measured in steps 206–210 by the rated charge current for that particular battery, $V^+=(Zx)* (Ix)$. The battery's steady state current voltage is determined at step 214 by referring to the battery chemistry and determining the cutoff voltage per cell based on the battery chemistry and multiplying this by the total number of battery cells, $Vss=(Vss/cell)* (N)$. An adjusted steady state cutoff voltage is calculated at step 216 by adding (or subtracting) the cutoff adjustment voltage to the steady state cutoff voltage $Vco=Vss+V^+$. This voltage Vco is thus compensated for the battery's impedance, charge current, chemistry, and number of cells. The charger then commences to rapid charge the battery at step 218 and monitor the battery (B+) voltage until the adjusted steady state cutoff voltage (Vco) is met or exceeded at step 220. Once the battery voltage meets or exceeds the adjusted steady state cutoff voltage (Vco) at step 220, the charger trickle charges the battery at step 222. The charger continues to rapid charge the battery until either the battery voltage meets or exceeds the adjusted steady state cutoff voltage or a timer expires, for example a three minute timer, at step 224. Once the timer expires at step 224, the flowchart returns to step 206 to take another relative impedance measurement and calculates a new adjusted steady state cutoff voltage. In this way, the relative impedance of the battery is measured periodically throughout the rapid charging process to provide a dynamically adjustable steady state cutoff voltage.

The charging technique 200 of the present invention can also be modified to monitor a thermistor (Rt) if desired. The thermistor could be monitored along with the capacity indicator at step 220. Once a predetermined temperature is reached the charger could begin trickle charging the battery.

Figure 3:
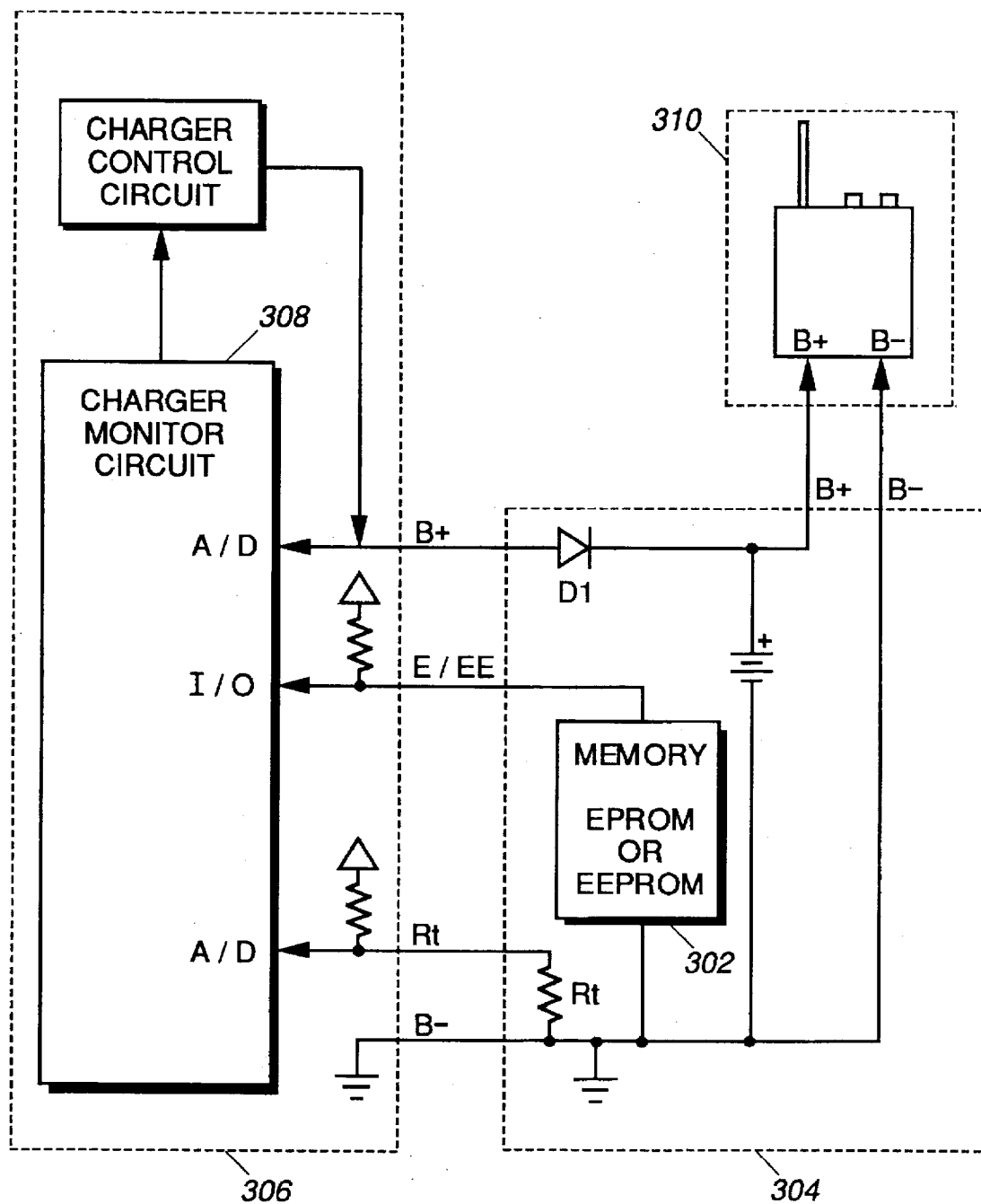
FIG. 3 is a block diagram of an alternative embodiment of a battery charging system utilizing the battery charging technique in accordance with the present invention.

Referring now to FIG. 3, there is shown a charging system 300 utilizing the charging technique described by the present invention. In this charger embodiment, a memory section 302, such as an electrically programmable read-only memory (EPROM) or electrically eraseable programmable read-only memory (EEPROM) is included within the battery 304. The memory section 302 provides the battery capacity indicator for the battery 304 and stores capacity data pertaining to number of battery cells, the battery chemistry, and the rated charge current. Charger 306 includes charger monitor circuit 308 which reads line E/EE to obtain the capacity data pertaining to the battery 304. While shown with a radio 310 coupled the battery 304, the charging technique of the present invention does not necessitate the presence of the radio to complete its charging routine. The charging technique of the present invention is applicable to both system embodiments, one using an Rc and the other using memory as the capacity indicator. In the charging system of FIG. 3, the charger 306 simply reads the memory through line E/EE to obtain the data required to determine the steady state cutoff voltage (Vss/cell) and the cutoff adjustment voltage ($V^+$). In the charging system of FIG. 1, the charger reads the Rc contact voltage which is translated, such as through a look-up table, to the pertinent information of number of battery cells, battery chemistry, and charge rate.

Take for example, a 1500 milliamp hour (mAh) battery formed of a nickel cadmium (NiCad) chemistry. The charger reads the battery capacity indicator, either Rc or memory, which indicates that there are six cells, that the rated charge current is 1500 mAh (1C), and that the chemistry is NiCad. Since the number of cells (six) and the chemistry (NiCad) are known, a look up table within the charger can be used to determine that the steady state cutoff voltage per cell is 1.2 volts. This steady state cutoff voltage per cell can vary for chemistry types. Taking 1.2 volts/cell and multiplying by the 6 cells provides the steady state cutoff voltage for the battery of approximately 7.2 volts. While the steady state cutoff voltage for the battery is the same for a six-cell 1000 mAh or a six-cell 2000 mAh NiCad, what will change is the cutoff adjustment voltage ($V^+$), because the rated charge current varies for the different battery capacities. Furthermore, the relative impedance will vary depending on the charge status of the battery. For example, an older 1500 mAh battery and newer a 1500 mAh battery will have different relative impedances as measured by the charger. By accounting for the varying charge rates and the variations in relative impedance, an optimized adjusted steady state cutoff voltage is achieved. A charging system utilizing a dynamically controlled cutoff adjustment voltage, as described by the invention, thus prevents the battery from being overcharged or undercharged.

Hence, by determining the charge rate of the battery and a relative impedance for the battery, a cutoff adjustment voltage can be calculated. By determining a steady state cutoff voltage for the battery and adjusting it with the cutoff adjustment voltage, an adjusted steady state cutoff voltage is determined with which to compare the battery voltage. Charging the battery until the adjusted steady state cutoff voltage is reached provides for an optimized charging system. Periodically readjusting the cutoff adjustment voltage provides the advantage of dynamic control for the charging system.

Accordingly, there has been provided an improved battery charger system capable of completing a charge cycle and maintaining a fully charged battery without overcharging or undercharging the battery. A charger utilizing the charging technique described by the invention can dynamically adjust itself to various batteries regardless of their chemistry type, number of cells, state of charge, or rated charge current and thus provides an enhancement to battery charging systems.

What is claimed is:

1. A method of charging a battery in a battery charger, comprising the steps of:

determining the charge rate of the battery;

determining the steady state cutoff voltage for the battery;

determining a relative impedance for the battery;

calculating an cutoff adjustment voltage based on the charge rate and the relative impedance;

calculating an adjusted steady state cutoff voltage based on the cutoff adjustment voltage; and charging the battery until the adjusted steady state cutoff voltage is reached.

2. A method of charging a battery in a battery charger, comprising the steps of:

determining the total number of battery cells in the battery;

determining the battery chemistry; determining the rated charge current for the battery;

determining, based on the battery chemistry and the total number of battery cells, a steady state cutoff voltage for the battery;

periodically measuring a relative impedance for the battery;

calculating a cutoff adjustment voltage based on the periodically measured relative impedance and the rated charge current;

establishing an adjustable steady state cutoff voltage by adding the cutoff adjustment voltage to the steady state cutoff voltage;

monitoring the battery voltage; and charging the battery with the rated charge current until the battery voltage reaches the adjustable steady state cutoff voltage.

3. The method of claim 2, wherein the battery includes a capacity resistor, and the number of battery cells, the battery chemistry, and the rated charge current are all determined by the charger monitoring the capacity resistor.

4. The method of claim 2, wherein the battery includes a memory portion for storing the number of battery cells, the battery chemistry, and the rated charge current; and the charger performs the steps of determining the number of battery cells, the battery chemistry, and the rated charge current by monitoring the memory portion of the battery.

5. A method of charging a battery in a charger, comprising the steps of:

at the charger:

determining the number of battery cells;

determining the steady state voltage per cell;

determining the rated charge current for the battery;

calculating the steady state cutoff voltage for the battery based on the number of battery cells and the steady state voltage per cell;

determining a relative impedance for the battery;

calculating a cutoff adjustment voltage based on the relative impedance and rated charge current;

adjusting the steady state cutoff voltage based on the cutoff adjustment voltage to provide an adjusted steady state cutoff voltage; and charging the battery until the adjusting steady state cutoff voltage is met.

6. The method of claim 5, wherein the battery includes a memory for storing data related to the number of battery cells, the steady state voltage per cell, and the rated charge current for the battery and wherein the steps of determining the number of battery cells, determining the steady state voltage per cell, and determining the rated charge current for the battery comprises the step of reading the data stored in the memory of the battery.

7. The method of claim 5, wherein the battery includes a capacity resistor and the steps of determining the number of battery cells, determining the steady state voltage per cell, and determining the rated charge current for the battery comprises the steps of:

measuring a voltage at the capacity resistor and translating the measured voltage to the number of battery cells, the steady state voltage per cell, and the rated charge current for the battery.

8. The method of claim 5, wherein the step of determining the steady state voltage per cell comprises the steps of:

determining the battery chemistry; and determining, based on the battery chemistry, the steady state voltage per cell.

9. The method of claim 5, wherein the step of determining a relative impedance of the battery is performed periodically.

10. The method of claim 9, wherein the step of determining a relative impedance of the battery includes the steps of; applying a first load current to the battery from the charger;

measuring a first loaded battery voltage;

applying a second load current to the battery from the charger;

measuring a second loaded battery voltage; and calculating the relative impedance of the battery based on a delta change in the first and second measured loaded voltages and a delta change in the first and second applied loaded currents.

11. A charging system for a battery, comprising:

a battery, including:

positive and negative terminals; and a capacity indicator terminal indicating the number of battery cells, the battery chemistry, and the rated charge current; and a charger, including:

a controller selectively sensing the capacity indicator terminal and determining a steady state cutoff voltage based on the battery chemistry and the number of battery cells, the controller also periodically measuring a relative impedance of the battery at the positive and negative terminals, and the controller dynamically compensating the steady state cutoff voltage in response to the relative impedance and the rated charge current.

12. The charging system of claim 11, wherein the capacity indicator terminal is coupled to a capacity resistor internal to the battery, the capacity resistor generating a voltage which indicating the number of battery cells, the battery chemistry, and the rated charge current.

13. The charging system of claim 11, wherein the capacity indicator terminal is coupled to a memory section located within the battery, the memory section storing data pertaining to the number of battery cells, the battery chemistry, and the rated charge current.

* * * * *

UNITED STATES PATENT AND TRADEMARK OFFICE
CERTIFICATE OF CORRECTION

PATENT NO. : 5,684,387
DATED : November 4, 1997
INVENTOR(S) : Joseph Patino

It is certified that error appears in the above-identified patent and that said Letters Patent is hereby corrected as shown below:

Item [57] Abstract, line 12, delete "stead" and insert therefor --steady--.

Column 4, line 22, delete "an" and insert therefor --a--.

Signed and Sealed this

Third Day of November, 1998

*Attest:*

BRUCE LEHMAN

*Attesting Officer*   *Commissioner of Patents and Trademarks*